June 22, 1965 C. J. BAUDER ETAL 3,190,059
POCKET FILTER
Filed May 3, 1962 4 Sheets-Sheet 1

INVENTORS
CARL J. BAUDER
CHARLES G. HART
BY
ATTORNEY

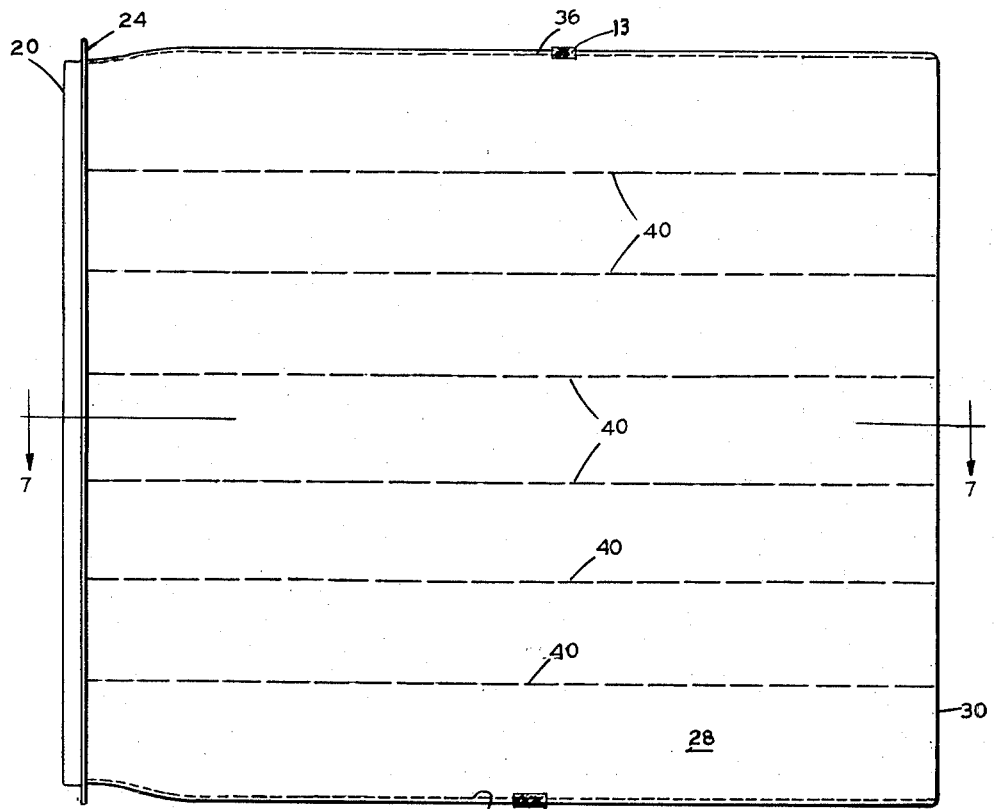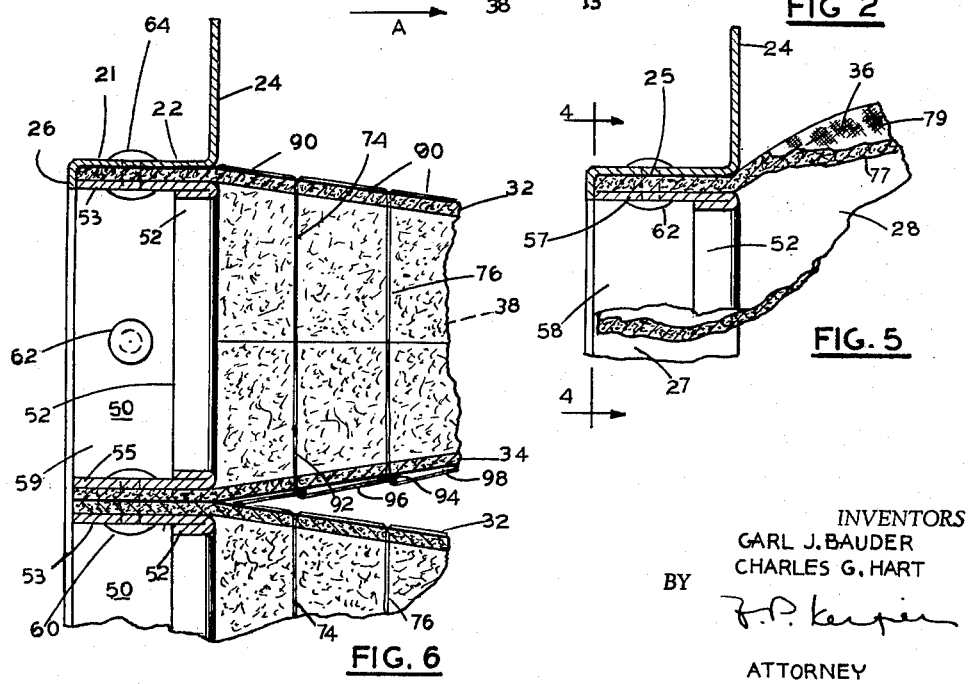

June 22, 1965     C. J. BAUDER ETAL     3,190,059
POCKET FILTER

Filed May 3, 1962                              4 Sheets-Sheet 3

INVENTOR.
CARL J. BAUDER
CHARLES G. HART
BY

ATTORNEY

June 22, 1965     C. J. BAUDER ETAL     3,190,059
POCKET FILTER

Filed May 3, 1962     4 Sheets-Sheet 4

INVENTORS.
CARL J. BAUDER
CHARLES G. HART
BY

ATTORNEY

United States Patent Office 3,190,059
Patented June 22, 1965

3,190,059
POCKET FILTER
Carl J. Bauder and Charles G. Hart, Syracuse, N.Y., assignors to Cambridge Filter Corporation, a corporation of New York
Filed May 3, 1962, Ser. No. 192,238
11 Claims. (Cl. 55—491)

This invention relates to space filters, and more particularly to space filters employing extended area filter media.

In Engle et al. 2,907,407 and 2,907,408 there is enclosed a filter construction wherein replaceable cartridges containing extended filter media in pleated formation are supported in casing structures having grids for supporting the filter media in such pleated formation. Such grids extend downstream from the air entrance to the air duct and in practice, in a filter unit of nominal 24" size, the grids may extend several feet into the duct in the downstream direction in order to provide support for a maximum area of filter media. The grids being of rigid formation thus occupy a corresponding length of duct, whether or not a filter cartridge is positioned thereon.

The present invention is directed to a filter cartridge construction wherein the need for supporting grid work is eliminated, and in which the extended areas of flexible filter media are arranged in a multiple pocket form, the pockets of which are partly sustained, during air flow, by the inflation effect resulting from differential pressure. When air flow is terminated, the multiple pockets of the filter, being flexible, tend to fold and can be folded out of the way, and thus do not obstruct any substantial length of air duct downstream of the supporting casing. Thus such air duct is accessible, and free of rigid grid work within the duct. The elimination of such grid work constitutes a saving in initial installation expense, and permits the use of air ducts, wherein the filter media is disposed, of a minimum length.

More particularly, the filter cartridge of the invention is composed of a casing, in which are disposed and mounted the open ends of a plurality of like pockets vertically disposed, and arranged side by side, and in which each individual pocket comprises an elongated fold of filter media to form the vertical pocket. Further each such pocket is provided with a series of horizontally extending rows of filamentary stays of gradually decreasing length from the upstream end of the pocket, which stays serve to control the spacing between the flanks of each pocket, to prevent intercontact between adjacent flanks of adjacent pockets. Such stays further serve to assist each pocket, when inflated from differential pressure, into assuming a symmetrical form about a vertical plane, with the adjacent flanks thereof lying substantially in planes converging downstream at the tip end of each pocket.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

FIGURE 2 is a side elevational view of the filter cartridge unit, as it appears while subject to differential pressure due to air flow in the direction of arrow A;

FIGURE 5 is an enlarged fragmentary sectional view taken on the line 5—5 of FIGURE 4 or FIGURE 1;

FIGURE 6 is an enlarged fragmentary sectional view taken on the line 6—6 of FIGURE 1;

Figure 1:
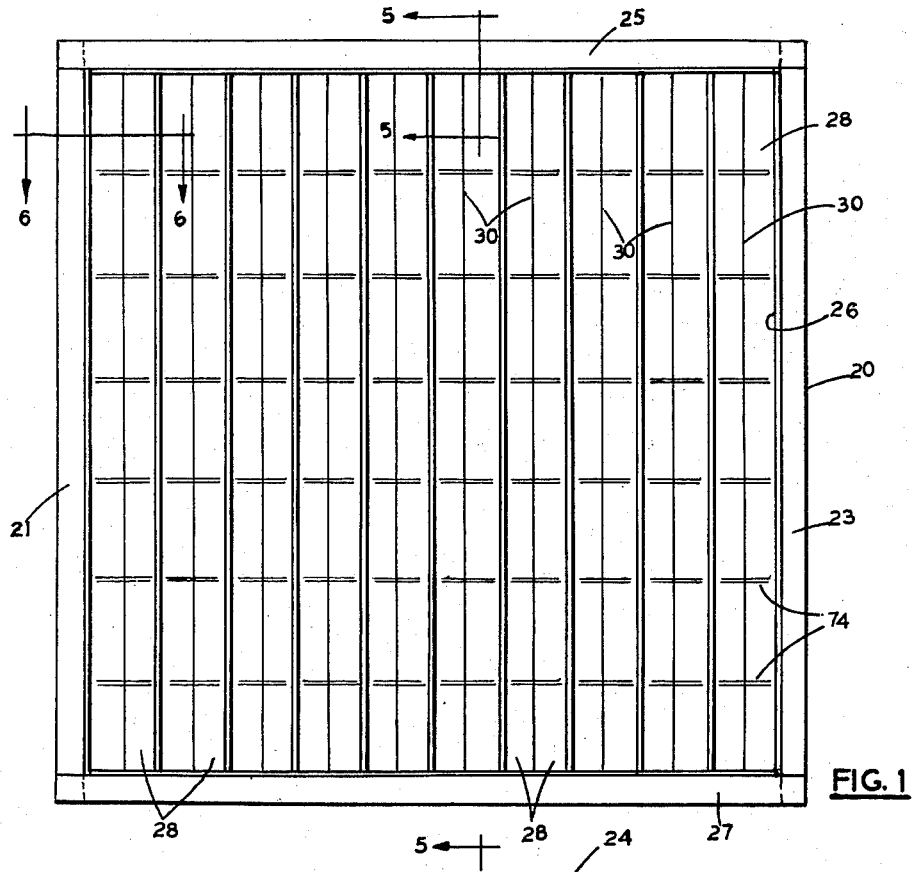
FIGURE 1 is a front elevational view of the filter cartridge unit.

Referring to the drawings there is shown a filter cartridge unit having a relatively square casing 20 formed of angle members 22, the angle members having a flange 24 adapted to cooperate with a seal and seat in a supporting compleemntary air duct frame. The angle members may be further stiffened by an inbent flange 26.

Figure 3:
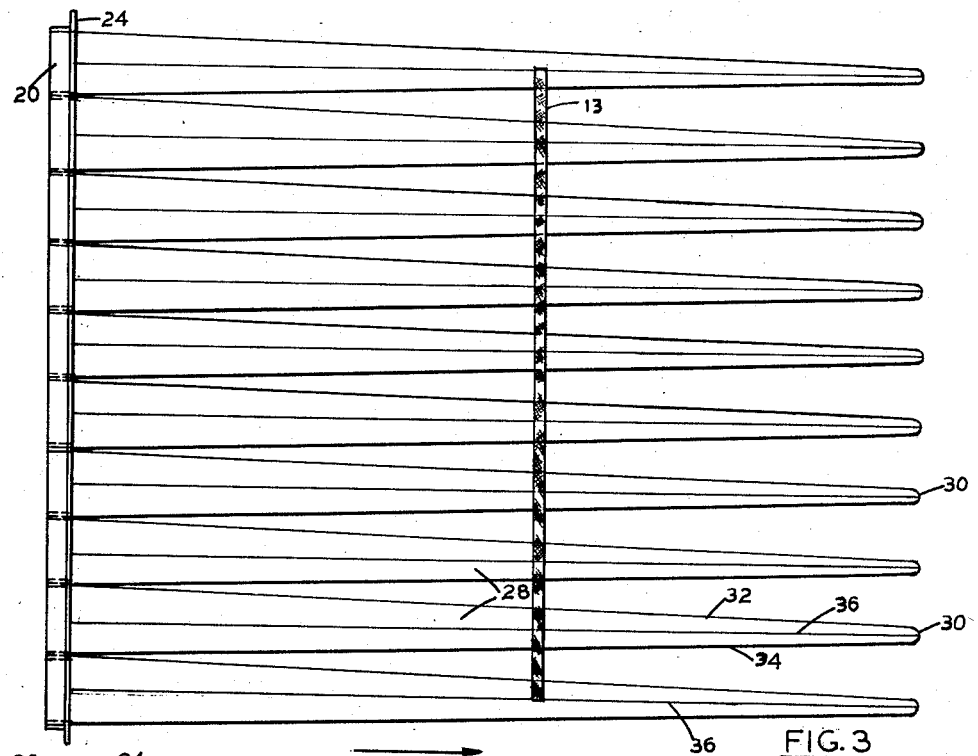
FIGURE 3 is a top plan view of the filter, while subject to differential pressure.

The casing, formed of uprights 21 and 23, and transverse members 25 and 27, forms a support for the open end of a plurality of like filter pockets or envelopes 28 formed of flexible sheet filter media. The pockets are disposed side by side so as to extend in parallel vertical planar relation in a downstream direction from the casing as indicated in FIGURE 3. The pockets are subjected to differential air pressure caused by air flow in the downstream direction indicated by arrow A.

Each pocket or envelope 28 may be formed of a single relatively long rectangular sheet of filter media, which may be folded as at 30, to form two flanks or sides 32 and 34. The side edges of the flanks are stitched together or otherwise secured along the top and bottom edges as at 36 and 38.

The width of the filter media employed to form the pockets, will be such that the perimeter of the open end, when given an elongated rectangular shape, will extend from the upper casing member 25 to the lower member 27, and be of a width, such that a selected number of pockets disposed side by side, ten being shown, will fill the space between the side casing members 21 and 23.

Figure 4:
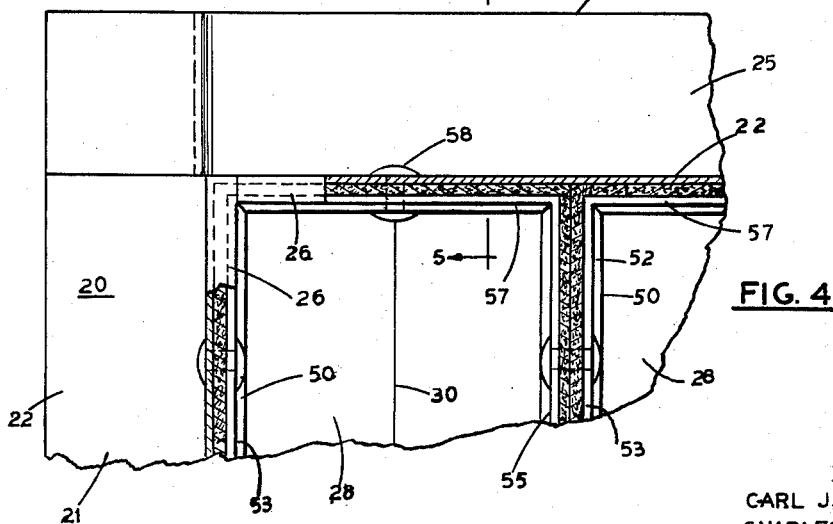
FIGURE 4 is a fragmentary enlarged front elevational view, with portions of the frame in section, taken on the line 4—4 of FIGURE 5.

In order to mount the open ends of ten such pockets in side by side relation within the casing 20, a plurality of vertically elongated rectangular frames 50 may be employed. Each frame 50 may be formed of strip material, having an internal stiffening bead, such as 52, extending along the downstream edge thereof. Each frame comprises elongated side portions 53 and 55, and upper and lower end portions or sections 57 and 59. The outside dimensions of the frames 50 are such as to permit the frames to be mounted within the open ends of their respective pockets, and in turn, permit the assembly of the frames and and open pocket ends within the casing with the filter media of the open pocket ends sandwiched between the adjacent frame members, and frame and casing members, in the manner indicated in FIGURES 4-7 inclusive. It will be seen that the adjacent frame members such as 55 and 53, in FIGURE 4, have disposed therebetween the media of the two adjacent pockets 28, and that the media of each of the pockets extends around their respective frames 50, and at the top and bottom, such media is disposed between the upper and lower portions 57 and 59 of the frame members and the casing members 25 and 27. The seams formed by the stitching at 36 and 38 will be disposed centrally of the upper and lower portions 57 and 59 of the frame members. The left hand pocket 28 of FIGURE 4 has its end portion sandwiched between the frame side 53, and the casing member 21. The bead 52 and the outturned flange 24, as seen in FIGURES 5 and 6 provide rounded edges to avoid injury to the media and protect it from sharp edges. The frames 50 may have their adjacent members such as 53 and 55, joined as by rivets 60, and frame members 57 and 59 may be secured to casing members 25 and 27 as by suitable fastenings 62, and the frame side portions adjacent the casing members 21 and 23 may likewise be secured as at 64. The frames may through such fastening means squeeze the media between one another, and within the casing. The media may be adhesively secured to the frames and casing, and may extend only part way into the frame and casing members, so that the adjacent frame members and casing members can be pinched together and spot welded.

It will be seen from the foregoing that the casing 20, and the frame members are adapted to secure a plurality of pockets with their open ends in uniform spaced parallel and vertical relation, into which an airstream may flow. In order to provide a substantial area of filter media it is desirable that each pocket have a substantial downstream length. It is also desirable to maintain the entire area of the media of each pocket effective for filtering. It is desirable that each pocket be self supporting from the casing and differential pressure created by the air stream, and that when inflated each pocket assumes a symmetrical disposition about a vertical plane extending in a downstream direction from the casing.

In addition the adjacent flanks of adjacent pockets should be maintained in spaced relation and out of contact since any contacting of adjacent flanks renders the contacting area ineffective for air passage therethrough, and thus ineffective as a filter.

In order to achieve a pocket capable of satisfying the foregoing conditions, and capable of self support from the casing and airstream flow in symmetry about a vertical plane extending normal to the plane of the casing, each pocket is provided with a series of rows of filamentary stays, extending between the pocket flanks, the rows of filamentary stays extending parallel to one another and substantially parallel with the upper and lower stitched edges 36 and 38, and at right angles to the end fold 30. Such rows are indicated in FIGURE 2 at 40.

Figure 7:
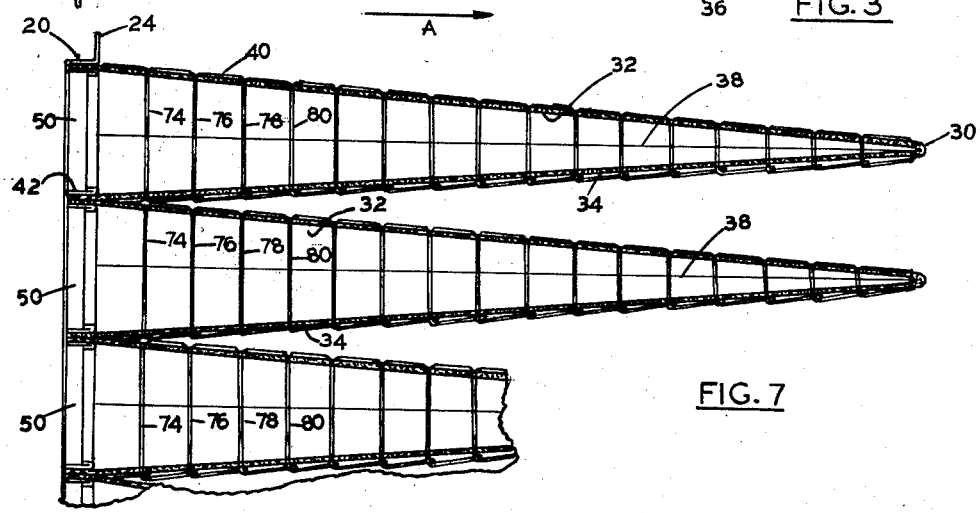
FIGURE 7 is a fragmentary sectional view taken on the line 7—7 of FIGURE 2.

As shown in FIGURES 6 and 7, each row of stays may in effect take the form of stitching, wherein the spacing between stitches is substantially uniform, but wherein each stitch comprises a portion which may be referred to as a stay, the length of which progressively decreases from stitch to stitch from the open end of the pocket to the downstream end thereof. In FIGURE 7, such stays are indicated by the reference characters 74 and 76, 78, and 80, and their length between flanks progressively decreases in approximately the manner shown.

The stitching employed to form such stays may be of the chain stitch type, as shown in FIGURE 6, wherein a single filament 90 extending along the outside of flank 32 has a loop portion 94 extending through the flank 32 and the flank 34 and through the loop end 94 of the preceding stitch, the loop portion 92 extending along the outside of flank 34, as at 96 to receive the loop portion 98 of the next stitch. The portion of the loop of each stitch extending between the spaced flanks 32 and 34 forms a stay which is adapted, together with the remaining stays, to provide a maximum spacing between the flanks of the filter pocket.

Figure 8:
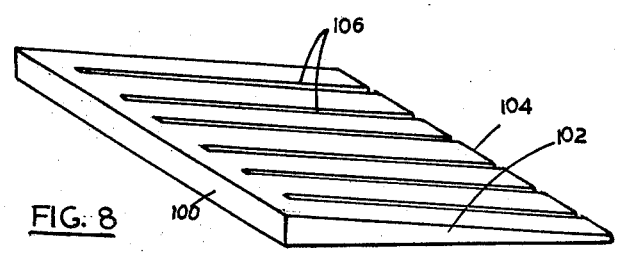
FIGURE 8 is a schematic perspective view of a form employed when applying the stitching stays to the individual air filter pockets.
Figure 9:
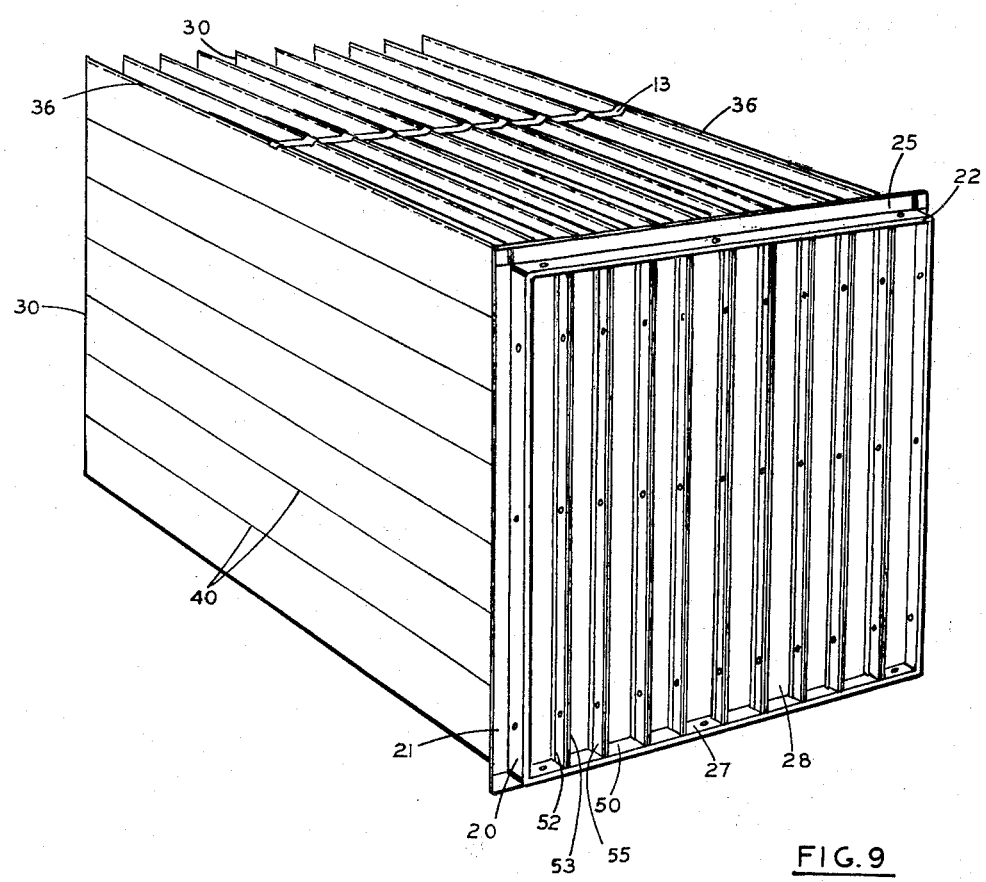
FIGURE 9 is a three dimensional figure showing the filter cartridge as inflated by the airstream flowing therethrough.

In order to facilitate the formation of chain stitching with stay portions of varying length along the stitch lines 40 of the pockets, a form of the general shape as shown in FIGURE 8 may be provided. Such form, at end 100, is of a width and thickness closely corresponding to the exterior dimensions of the frame members 50. Its thickness tapers along its length as at 102, and its length corresponds to the depth of the pocket for which it is adapted. The form is adapted to be inserted within a pocket, with its thin edge 104 disposed adjacent the pocket fold. The slots 106, when the form is inserted within a filter pocket, provide clearance for the elongate needle of the stitching machine whereby the rows of chain stitches may be rapidly formed, the tapered form holding the filter media flanks spaced in graduated formation whereby the stitches will form stays of gradually varying length. The form as shown, is provided with six slots, and it is contemplated that a multiple head stitching machine may form the stitches and stays of all six rows simultaneously if desired.

The filter media (see FIGURE 5) comprises a flexible mat 77 of fine filtering filaments such as fine fiberglass. The exterior of the filter media is provided with a layer of coarse netting such as cheese cloth or open mesh fabric as is indicated at 79. Since the stay portions of the stitches pierce the filter media, and tend to form small bypass apertures, a layer of adhesive sealant is applied to the exterior of both flanks of each pocket, along the stitch lines, and such adhesive serves to fix or lock the stitches, so that the thread cannot slide or shift, or unravel.

It will be understood that a plurality of identical pockets, for example ten in number, will be formed in the manner indicated, that is by folding over a length of filter media, stitching the same along the side edges, and providing the chain stitching effective to produce the rows of stays of graduated length and uniform spacing. Thereafter the open ends of the pockets are provided with frames 50, and assembled within the casing 20. The internal and external surfaces of the open ends of the pockets where sandwiched between the frames 50, and frames and casing 20 may be provided with an adhesive sealant. Thereafter the frames and casing may be mechanically secured together as by the rivets, welding, or other fastening means as desired.

The filter unit, as thus completed, is mounted in an air duct frame, with the casing lying in a vertical plane and the open ends of the pockets disposed vertically. In the absence of air flow creating differential pressure, the free ends of the filter pockets tend to fold over gently and depend downwardly. However, once such assembly is subjected to an airstream, and consequent differential pressure, the pockets in unison become inflated to the extent permitted by the stays, and all pockets become self-supporting in parallel arrangement, and each pocket becomes substantially symmetrical about a vertical central plane extending downstream perpendicularly from the plane of the casing. If desired the upper edges of each of the pockets may be tied together with a flexible tape such as 13 secured to the approximate midpoint of the upper edge of each pocket. Such a tape serves as an assist from pocket to pocket for group action when air flow commences to inflate and extend the pockets.

The rows of stays of uniform spacing and of gradually diminishing length coact with the flexible media to provide, when inflated by the differential pressure of the airstream, a series of outstanding pockets, separate from and spaced from each other. Each pocket has its flanks gradually converging in the direction of air flow, and the rate of flow within each pocket from inlet end to tip end is quite uniform by reason of the uniform escape of air through the media flanks.

Thus the wedge shape of the pocket provides a corresponding decreasing cross section adequate to handle the air, which is gradually diminished by the air that has passed through the pocket flanks. While chain stitching for forming the stays has been referred to as an economical and desirable mode of constructing the pockets, any suitable form of stitching, as will produce the stays may be employed, the purpose of the stitching being merely to provide a means for forming rows of stays which will be effective when taut to cooperate with the flanks of the filter media in providing symmetrical support for the pockets, when inflated by differential pressure resulting from the air stream flowing through the media. In fact, while stitching is found to be an economical means for providing means to fix the spacing between the flanks in the converging manner described, instead of rows of stays, webbing, thin flexible sheet material, perforate or otherwise, in the form of long tapered fingers can be employed, the side edges being sewed or otherwise secured to the opposite flanks to provide the graduated converging spacing.

In practice the downstream length of each pocket, in a nominal 24 inch cartridge, may be 30 to 36 inches or even more without adversely affecting the ability of each pocket, when inflated, from becoming self-sustaining in a symmetrical fashion. While the filter media, with its mesh fabric exterior supporting layer has been referred to as flexible, the stiffness or flexibility of the media may vary the number of rows of stays employed; for example, with increased flexibility, the rows may be more closely spaced. The stiffness of the media, with all stays drawn taut through inflation pressure provide a sustaining force which causes each pocket to assume the symmetrical disposition referred to.

It will be readily apparent that the cartridge with its rigid square casing may be readily folded for conserving space, both for storage and during transportation. It will also be seen that except for the casing and frame members, and the filamentary stays, the media, of which the cartridge is formed constitutes substantially the entire cost, and thus, when such media becomes expended from an accumulation of foreign matter sufficient to render the same inefficient, disposal and replacement by a new cartridge is effected at a minimum of cost.

When such filter cartridges are positioned within an air duct, and the air stream is shut down, the successive pockets tend to fold over and are readily flexed out of the way, should an interior inspection of the air duct be desirable.

While a single modification of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. An air filter cartridge comprising a rectangular support casing having opposite sides and a top and bottom and upstream and downstream ends, a plurality of filter pockets formed of flexible sheet filter media, and each composed of two flanks joined along the top and bottom and downstream edges, and having an elongated open end at the upstream edges, said pockets having their elongated open ends disposed in parallel relation to said sides and in side by side relation within said casing, with each of said pocket openings extending from top to bottom of said casing, and all of said pocket openings filling the space from said to side of said casing, stiffening frame means disposed internally of the open ends of said pockets to maintain said pockets open at said open end, and a series of rows of filamentary stays within each pocket connecting the opposed flanks of each pocket along lines extending substantially parallel with the top and bottom edges of said pockets, the stays of each row decreasing in length from the upstream end to the downstream end of said pockets and being of such a length as to prevent adjacent flanks of adjacent pockets from contact when inflated by air flow into the open ends of the pockets.

2. An air filter cartridge comprising a rectangular support casing having opposite sides and a top and bottom and upstream and downstream ends, a plurality of filter pockets formed of flexible sheet filter media, and each composed of two flanks joined along the top and bottom edges and downstream end, and having an elongated open end at the upstream edges, said pockets having their elongated open ends disposed in parallel relation to said sides and in side by side relation within said casing, each of said pocket openings extending from top to bottom of said casing, and all of said pocket openings filling the space from side to side of said casing, means for sealing the exterior of said pocket openings to adjacent pockets and to said casing and for maintaining said pockets open at said open end, and parallel rows of filamentary stays within each pocket extending from the upstream to the downstream end connecting the opposed flanks of each pocket and of decreasing length from the upstream to downstream ends of said pockets whereby the flanks of each of said pockets, when the pocket open ends are disposed vertically and inflated by differential air pressure, lie substantially in vertical planes converging at the downstream end, with the flanks of adjacent pockets out of contact with one another.

3. An air filter cartridge comprising a rectangular support casing having opposite sides and a top and bottom and upstream and downstream ends, a plurality of filter pockets formed of flexible sheet filter media having an exterior layer of mesh fabric, and each composed of two flanks joined along the top and bottom edges and downstream end, and having an elongated open end at the upstream edges, said pockets having their elongated open ends disposed vertically and in side by side relation within said casing, with each of said pocket openings extending from top to bottom of said casing, and all of said pocket openings filling the space from side to side of said casing, stiffening frame means disposed internally of the open ends of said pockets for maintaining said pockets open at said open ends, and a series of rows of parallel filamentary stays extending from the upstream to the downstream end within each pocket connecting the opposed flanks of each pocket and of decreasing length from the upstream to downstream ends of said pockets whereby the flanks of each pocket, when the pocket open ends are disposed vertically and inflated by differential air pressure, lie substantially in vertical planes converging at the downstream end with the flanks of adjacent pockets out of contact with one another.

4. An air filter cartridge as set forth in claim 3, wherein the stays are disposed in spaced rows extending parallel with the top and bottom edges.

5. An air filter cartridge as set forth in claim 3, wherein the stays are disposed in uniformly spaced rows extending substantially perpendicular to the downstream end, and further constitute the loop portions of stitching.

6. A cartridge as set forth in claim 3, wherein the stays are disposed in uniformly spaced rows extending substantially perpendicular to the downstream end, and further constitute loop portions of stitching, and adhesive sealant applied along the stitching rows on the exterior surface of the flanks to seal stitching punctures through the flanks, and lock stitches in place.

7. A filter pocket for an air filter cartridge formed of flexible sheet filter media, and composed of two substantial rectangular flanks joined along the opposite side edges and one end, and having an elongated opening at the other end, said pocket having a series of rows of filamentary stays within each pocket connecting the opposed flanks of each pocket along lines extending parallel with the side edges of said pockets, said stays in each row within the pocket decreasing correspondingly in length from the open end to said other end of said pockets, said opening having a width greater than the length of the longest stays.

8. An air filter cartridge comprising a rectangular support casing having opposite sides and a top and bottom and upstream and downstream ends, a plurality of filter pockets formed of flexible sheet filter media, and each composed of two flanks joined along the opposite side edges and one end, and having an elongated rectangular opening at the other end, said pockets having their elongated rectangular open ends disposed in side by side relation within said casing, with each of said pocket openings extending from top to bottom of said casing, and all of said pocket openings filling the space from side to side of said casing, stiffening frame means disposed internally of the open ends of said pockets for maintaining said pocket openings at said other end, and a plurality of substantially parallel spaced flexible connecting means arranged in rows within each pocket connecting the opposed flanks of each pocket along lines extending parallel with the top and bottom edges of said pockets and extending from the other end to the one end, said connecting means being of graduated length and providing gradually decreasing spacing between flanks from the open to the joined ends of said pockets, said connecting means being of such a length as to prevent adjacent flanks of adjacent pockets from contact when inflated by air flow into the open ends of the pockets.

9. A filter pocket for an air filter cartridge, said pocket formed of flexible sheet filter media, and composed of two flanks joined along opposite side edges and one end, and having an elongated opening at the other end, said pocket having a plurality of substantially parallel spaced flexible connecting means arranged in rows within the pocket connecting the opposed flanks of each pocket along lines extending substantially parallel with the side edges of said pockets, said connecting means being of graduated length from the open end to said one end and within the pocket providing gradually decreasing spacing between flanks from the open to the other end of said pocket when inflated by air entering the pockets for filtration in passing through the flanks thereof, said opening being of a width greater than the length of the longest connecting means.

10. An air filter cartridge in accordance with claim 8 wherein the top and bottom edges of all of the pockets are joined by a flexible tape, extending parallel with the top and bottom plane of the casing, and disposed substantially midway between the downstream end of the casing and downstream edges of the pockets, said tape being attached to the top and bottom edges of adjacent pockets at intervals along the tape corresponding to the spacing between the pockets.

11. An air filter cartridge comprising a rectangular support casing having spaced side uprights, and top and bottom connecting members and upstream and downstream ends, a plurality of filter pockets formed of flexible sheet filter media and each pocket composed of two substantially rectangular flanks joined along the top and bottom and downstream edges, and having an elongated rectangular open end at the upstream edges, said pockets having their elongated rectangular open ends disposed vertically and in side by side relation within said casing, with each of said pocket openings extending from top to bottom of said casing, and all of said pocket openings together filling the space from side to side of said casing, elongated rectangular stiffening frames disposed internally of the open ends of said pockets to maintain said pockets open, said frames having long side members and short top and bottom connecting sections, means for connecting the side members of adjacent frames and compressing the filter media therebetween at frequent intervals, means for connecting at least some of the short top and bottom sections of said frames to the adjacent top and bottom members of said casing and compressing the filter media therebetween, and means for connecting the two frame side members adjacent the casing uprights to the respective uprights and compressing the filter media therebetween, and a plurality of substantially parallel stays arranged in rows connecting the two flanks of each pocket and disposed at intervals over the pocket flanks, said stays being of such a length to prevent the adjacent flanks of two adjacent pockets from contact, when the pockets are inflated by differential air pressure from air entering the pockets from their open ends for filtration.

References Cited by the Examiner
UNITED STATES PATENTS

| | | | |
|---|---|---|---|
| 1,012,122 | 12/11 | Budil | 55—502 |
| 1,796,675 | 3/31 | Upson et al. | 112—429 |
| 2,050,508 | 8/36 | Strindberg | 55—496 |
| 2,079,315 | 5/37 | Dickerson | 55—293 |
| 2,487,988 | 11/49 | Zeier | 112—429 |
| 2,819,724 | 1/58 | Barker | 135—1 |
| 2,853,154 | 9/58 | Rivers | 55—341 |
| 2,857,017 | 10/58 | Nutting | 55—500 |
| 3,026,967 | 3/62 | Stevens et al. | 55—500 |
| 3,099,547 | 7/63 | Hagendoorn et al. | 55—341 |

HARRY B. THORNTON, *Primary Examiner.*
REUBEN FRIEDMAN, *Examiner.*